(12) United States Patent
Bilinski et al.

(10) Patent No.: US 10,133,816 B1
(45) Date of Patent: Nov. 20, 2018

(54) USING ALBUM ART TO IMPROVE AUDIO MATCHING QUALITY

(71) Applicant: Google LLC, Mountain View, CA (US)

(72) Inventors: Brandon Bilinski, San Francisco, CA (US); Jai John Mani, San Francisco, CA (US)

(73) Assignee: Google LLC, Mountain View, CA (US)

( * ) Notice: Subject to any disclaimer, the term of this patent is extended or adjusted under 35 U.S.C. 154(b) by 102 days.

(21) Appl. No.: 13/906,980

(22) Filed: May 31, 2013

(51) Int. Cl.
*G06F 17/30* (2006.01)

(52) U.S. Cl.
CPC ............................... *G06F 17/3074* (2013.01)

(58) Field of Classification Search
USPC ............ 707/748, 769, 825; 711/173; 463/32
See application file for complete search history.

(56) References Cited

U.S. PATENT DOCUMENTS

| | | | |
|---|---|---|---|
| 6,868,403 B1* | 3/2005 | Wiser ...................... | G06F 21/10 705/1.1 |
| 7,196,258 B2* | 3/2007 | Platt .................. | G06F 17/30038 700/94 |
| 2002/0052933 A1* | 5/2002 | Leonhard ............... | G06Q 30/06 709/219 |
| 2006/0195512 A1 | 8/2006 | Rogers et al. | |
| 2006/0236847 A1 | 10/2006 | Withop | |
| 2007/0169142 A1* | 7/2007 | Claassen ............ | H04N 7/17318 725/10 |
| 2008/0249982 A1* | 10/2008 | Lakowske ......... | G06F 17/30743 |
| 2009/0215533 A1* | 8/2009 | Zalewski ................ | A63F 13/00 463/32 |
| 2009/0235044 A1* | 9/2009 | Kisel et al. .................... | 711/173 |
| 2009/0249222 A1* | 10/2009 | Schmidt ............. | H04N 21/2368 715/751 |
| 2009/0327891 A1 | 12/2009 | Holm et al. | |
| 2010/0106537 A1* | 4/2010 | Yuasa et al. ...................... | 705/7 |
| 2010/0191739 A1* | 7/2010 | Wessling et al. ............. | 707/748 |
| 2010/0235923 A1 | 9/2010 | Schepis et al. | |
| 2010/0312808 A1* | 12/2010 | Mehta ........................... | 707/825 |
| 2011/0087690 A1* | 4/2011 | Cairns ........................... | 707/769 |
| 2011/0231397 A1* | 9/2011 | Van Megchelen ........................... | G06F 17/30879 707/736 |

* cited by examiner

*Primary Examiner* — Etienne Leroux
(74) *Attorney, Agent, or Firm* — Byrne Poh LLP (57) ABSTRACT

A method for managing a cloud music account of a user is provided, including the following method operations: receiving metadata obtained from an audio file stored on a client device; receiving an audio sample obtained from audio content of the audio file; receiving image data processed from an image associated with the audio file; analyzing the metadata, audio sample, and image data to determine an identity of the audio content of the audio file; and associating to the cloud music account of the user a permission to access cloud-based audio content corresponding to the identity of the audio content of the audio file.

14 Claims, 5 Drawing Sheets

USING ALBUM ART TO IMPROVE AUDIO MATCHING QUALITY

BACKGROUND

1. Field

The present disclosure relates to methods, systems, and computer programs for using album art to improve audio matching quality for a cloud-based audio service.

2. Description of the Related Art

Internet applications have grown tremendously over the years and so have the functionality provided to devices that access those applications. One area that has seen such growth relates to audio file management. As users continue to purchase and store more audio music files on their devices, management of those files becomes ever more important. Commonly, users have music libraries on various devices and those devices are usually backed up from time to time. If a user has more than one device, more synchronization is necessary to ensure that each device has access to the desired music. As users upgrade their devices or lose their devices, added complexities arise in syncing new devices to older music libraries. Many times, the management becomes so extensive that users lose some or most of their libraries.

To address these issues, services are now being provided to allow online cloud storage of their music files. However, improvement is still needed to address various challenges posed by cloud storage and to enable new features for interfacing with a user's music library. One area in which improvement may be sought concerns the importation of music files from a local music library to a cloud-based music library. It is in this context that embodiments arise.

SUMMARY

Embodiments of the present disclosure provide methods, systems, and computer programs for using album art to improve audio matching quality for a cloud-based audio service. It should be appreciated that the present disclosure can be implemented in numerous ways, such as a process, an apparatus, a system, a device or a method on a computer readable medium. Several inventive embodiments of the present disclosure are described below.

In one embodiment, a method for managing a cloud music account of a user is provided, including the following method operations: receiving metadata obtained from an audio file stored on a client device; receiving an audio sample obtained from audio content of the audio file; receiving image data processed from an image associated with the audio file; analyzing the metadata, audio sample, and image data to determine an identity of the audio content of the audio file; and associating to the cloud music account of the user a permission to access cloud-based audio content corresponding to the identity of the audio content of the audio file; wherein the method is executed by a processor.

In one embodiment, the metadata includes one or more of a file name, an artist, a title, or an album.

In one embodiment, the image data processed from the image associated with the audio file is defined by a hash of at least a portion of the image.

In one embodiment, the image associated with the audio file is stored in the metadata from the audio file or stored in a same directory on the client device as the audio file.

In one embodiment, analyzing the image data to determine the identity of the audio content of the audio file includes determining, based on the image data, whether the audio content of the audio file corresponds to an explicit version or a non-explicit version of a song.

In one embodiment, analyzing the image data includes determining whether the image data corresponds to image data associated with the explicit version of the song or to image data associated with the non-explicit version of the song.

In one embodiment, analyzing the image data includes determining the presence or absence of an advisory label in the image data.

In another embodiment, a method for adding a song to a cloud music account of a user is provided, including the following method operations: receiving metadata obtained from an audio file stored on a client device; receiving an audio sample obtained from audio content of the audio file; analyzing the metadata and the audio sample to identify one or more songs corresponding to the audio file; if the one or more songs defines a single song, then associating to the cloud music account of the user a permission to access cloud-based audio content of the single song; if the one or more songs defines a plurality of songs, then receiving image data processed from an image associated with the audio file, analyzing the image data to identify one of the plurality of songs corresponding to the audio file, and associating to the cloud music account of the user a permission to access cloud-based audio content of the identified one of the plurality of songs; wherein the method is executed by a processor.

In one embodiment, the metadata includes one or more of a file name, an artist, a title, or an album.

In one embodiment, the image data processed from the image associated with the audio file is defined by a hash of at least a portion of the image.

In one embodiment, the image associated with the audio file is stored in the metadata from the audio file or stored in a same directory on the client device as the audio file.

In one embodiment, analyzing the image data to identify one of the plurality of songs corresponding to the audio file includes determining, based on the image data, whether the audio content of the audio file corresponds to an explicit version or a non-explicit version of a song.

In one embodiment, analyzing the image data includes determining whether the image data corresponds to image data associated with the explicit version of the song or to image data associated with the non-explicit version of the song.

In one embodiment, analyzing the image data includes determining the presence or absence of an advisory label in the image data.

In another embodiment, a non-transitory computer readable medium having program instructions embodied thereon for managing a cloud music account of a user is provided, the program instructions including the following: program instructions for receiving metadata obtained from an audio file stored on a client device; program instructions for receiving an audio sample obtained from audio content of the audio file; program instructions for receiving image data processed from an image associated with the audio file; program instructions for analyzing the metadata, audio sample, and image data to determine an identity of the audio content of the audio file; and program instructions for associating to the cloud music account of the user a permission to access cloud-based audio content corresponding to the identity of the audio content of the audio file.

In one embodiment, the image data processed from the image associated with the audio file is defined by a hash of at least a portion of the image.

In one embodiment, the image associated with the audio file is stored in the metadata from the audio file or stored in a same directory on the client device as the audio file.

In one embodiment, analyzing the image data to determine the identity of the audio content of the audio file includes determining, based on the image data, whether the audio content of the audio file corresponds to an explicit version or a non-explicit version of a song.

In one embodiment, analyzing the image data includes determining whether the image data corresponds to image data associated with the explicit version of the song or to image data associated with the non-explicit version of the song.

In one embodiment, analyzing the image data includes determining the presence or absence of an advisory label in the image data.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

DETAILED DESCRIPTION

The following embodiments describe methods, computer programs, and systems for using album art to improve audio matching quality for a cloud-based audio service.

It will be apparent, that the present embodiments may be practiced without some or all of these specific details. In other instances, well known process operations have not been described in detail in order not to unnecessarily obscure the present embodiments.

For purposes of the present disclosure, a "song" shall refer to a specific audio work, whereas an "audio file" or "music file" shall refer to a data file containing audio data that may be read or played so as to reproduce a previously recorded sound. Thus, each particular song is unique, whereas there may be many different types of audio files that encode the same song. A song or a track is typically performed by an artist, and may be part of an album. A typical audio file may have any of various audio file formats, such WAV, MP3, AAC, WMA, FLAC, etc., and may include various types of metadata, such as that contained in ID3 tags. Despite having different meanings, it will be apparent that in many situations, the terms "song" and "audio file" or "music file" may each be accurately applied, or even used interchangeably. For example, a music library consisting of a number of audio files can also be said to contain the various songs for which the audio files encode.

A cloud-based music service allows users to listen to music by streaming the audio data from a remote server to a local client device running a player application. Some music services allow users to upload songs from a local music library to a cloud-based library. The songs can then be streamed on demand to a local client. By placing their music libraries in a cloud-based system, users are able to access their music from any device supporting a compatible player application and having the requisite network connectivity for music streaming. Furthermore, users can take advantage of various features which may be offered by the cloud-based music service, including management features which allow the user to organize their music as they see fit, search tools, playlist generation, social network integration, etc.

While storage of a user's music library with a cloud-based music service can provide many advantages, uploading audio files from the user's local music library can be bandwidth intensive and very time-consuming, especially when there are a large number of audio files in the user's local music library. Therefore, an alternative model for acquiring a user's music library does not require the actual transfer of a each song's full audio data from the client to the cloud service. Instead, each song in the user's local music library is identified, and a permission is set for the user to access/stream the same song from an existing cloud-based catalog of songs. In this manner, audio files from the user's local library are not uploaded, but are simply identified as encoding a particular song; and the identified song is then made available to the user from the cloud-based music service. For purposes of the present disclosure, this process shall be characterized as "importing" a user's local music library to a cloud-based library, though it should be understood that this import process does not entail uploading of audio files or their complete audio content. (However, as discussed further below, an audio sample may be uploaded for identification purposes.)

It will be appreciated that in such a system, wherein a user's locally-stored audio files are matched to existing cloud-based audio files, it is important to accurately identify the audio content of the user's locally-stored audio files. For if the locally-stored audio files are not matched correctly, then a poor user experience may result, wherein music streamed to the user's client device from the cloud music service does not match that of the locally-stored audio file, and consequently does not meet the expectation of the user. One example of a situation in which inaccurate matching may occur stems from the existence of explicit and non-explicit versions of a song. A given song may be released in two versions—one containing explicit lyrics, and another (e.g. a radio edit version) with non-explicit lyrics. Both versions of the song may have similar or identical metadata, and may have very similar audio as well. Thus, distinguishing between the two versions can be quite difficult. Embodiments of the disclosure as described herein provide methods and systems for using album art to improve audio matching quality for a cloud-based audio service. While specific embodiments are drawn to solving the problem of distinguishing between explicit and non-explicit versions of a song, it should be appreciated that in other embodiments, principles described herein may be applied to other situations to facilitate accurate determination of the audio content of a given audio file.

Figure 1:
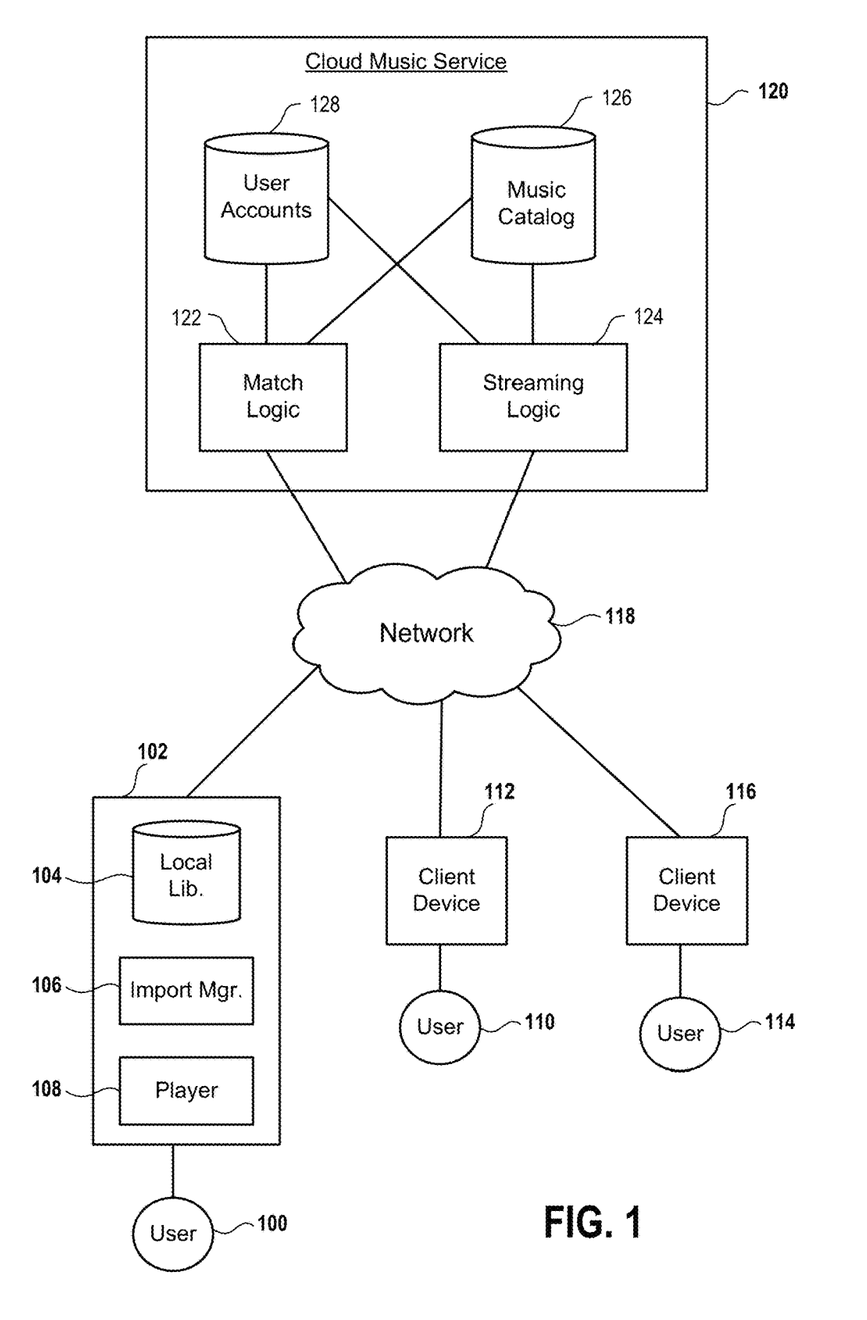
FIG. 1 illustrates a system for providing a cloud-based music service, in accordance with an embodiment of the disclosure.

FIG. 1 illustrates a system for providing a cloud-based music service, in accordance with an embodiment of the disclosure. Various users 100, 110 and 114 operate respective client devices 102, 112, and 116. Each of the client devices can communicate over the network 118, which may include any of various kinds of networks, including but not limited to, local area networks, wide area networks, the Internet, and various wired and wireless networks. A client device can be any type of computing device that is capable of interfacing with a cloud music service and providing some or all of the functionality described herein in relation to the cloud music service, such as importing songs to a user's cloud music library, playing music streamed from the cloud music library, or otherwise managing the cloud music library. Thus, a client device may be, but is not limited to, any of the following: a personal computer, a laptop, a cellular phone, a mobile device, a tablet computer, a personal digital assistant (PDA), a general purpose computer, a special purpose computer, an audio device, a media player, etc. In some embodiments, the client device may include audio output hardware, such as speakers, analog/digital audio signal outputs, a headphone jack, etc.

The cloud music service 120 is defined to include match logic 122 and streaming logic 124, along with a music catalog 126 and user account storage 128. The music catalog 126 contains audio files which are available for streaming. The user account storage 128 contains information defining user accounts, including users' music libraries, which for a given user defines a listing of songs which are available for streaming to the user. In the illustrated embodiment, the client device 102 is shown to include a local music library 104, which includes audio files stored on the client device 102. An import manager 106 communicates information about the audio files in the local music library 104 to the match logic 122. Based on this information, the match logic 122 identifies corresponding songs in the music catalog 126, and assigns permissions to the user's account to allow the user to access the corresponding songs.

Player logic 108 is defined on the client device 102 for streaming music from the cloud music service. Player logic 108 provides an interface for the user 100 to browse their cloud music library and select one or more songs for playback at the client device. Player logic 108 communicates the user's selections to streaming logic 124, which retrieves and streams audio data for the appropriate song(s) to the player logic 108. Player logic 108 receives the streamed audio data and effects playback of the audio data, e.g. decoding the audio data or otherwise rendering the audio data for output.

Figure 2:
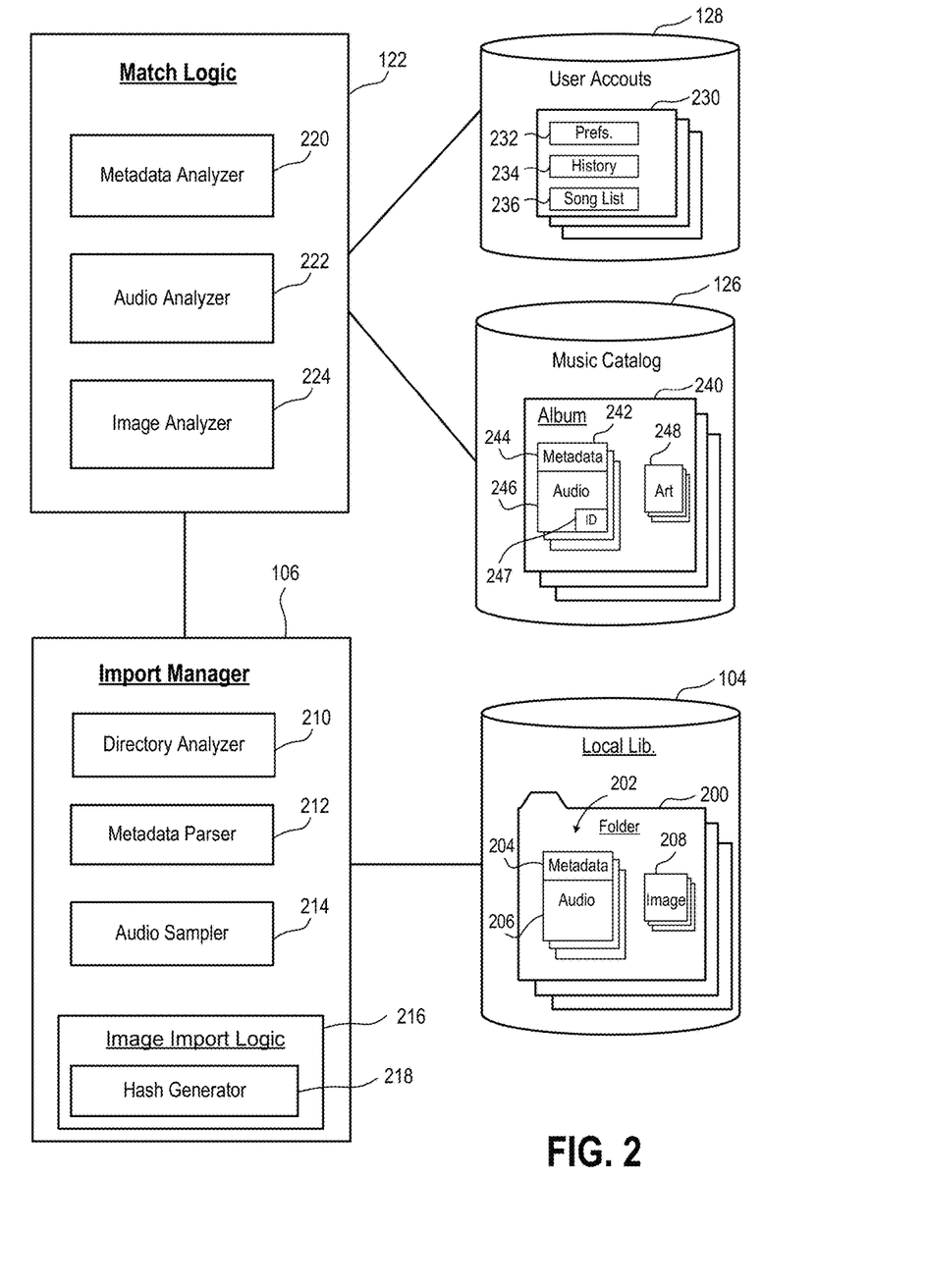
FIG. 2 illustrates components of a match logic and an import manager, in accordance with an embodiment of the disclosure.

FIG. 2 illustrates components of the match logic and import manager, in accordance with an embodiment of the disclosure. In some embodiments, the local music library 104 can be defined by a directory structure of a file system. For example, it is typical for a user to store music in various folders for purposes of organizing their music files. It will be appreciated that the folders which define the user's music library can have any hierarchical directory structure in accordance with the user's organizational preferences. For example, there may be a top-level music folder which contains the user's music library. Within the top-level music folder there may be several artist folders which are defined to contain music by a given artist. Within a given artist folder, there may be one or more album folders, and each album folder may contain audio files from a particular album of the artist. The foregoing merely describes one possible allocation of folders within a file system for defining a user's music library. It should be appreciated that users may organize music files according to other schemas, or utilizing other types of organizational factors or combinations of factors, in accordance with their personal preferences. For example, some users may organize music utilizing various other factors such as genre, date (e.g. year of release), alphabetization, encoding format, bit rate, language, or any other type of factor according to which music files can be organized. Thus, it should be appreciated that a user's local music library can be defined by one or more folders in a file system, some of which may contain music files, and some of which may provide access to other folders.

Each audio file 202 includes audio data 206 which defines the audio content of the audio file, and metadata 204 which describes or contains information related to the audio content of the audio file. In one embodiment, the metadata is an ID3 tag. In other embodiments, other metadata formats may be defined for the audio file 202. It will be appreciated that metadata associated with a given audio file can include various kinds of information related to the audio content of the audio file, such as artist, album artist, album, title, length, date/year of release, genre, lyrics, album art, etc. Additionally, in the same folder 200 there may be one or more images related to the audio files, such as image 208. In some embodiments, the images may include album art or other images related to the music contained in the folder 200.

The import manager 106 defines logic for importing the user's local music library 104 to the user's account on the cloud-based music service. It should be appreciated that in various embodiments, the import manager can be defined in accordance with the functionality of the cloud-based music service. For example, in one embodiment, the cloud-based music service is accessible via a standalone application installed on the client device 102, with the import manager being defined as a module that is part of the standalone application. In another embodiment, the cloud music service is accessible via a web interface through a browser application executing on the client device. The import manager may be defined as part of the web interface—for example as an applet or client-side script that is activated when the user opts to import their local music library to the cloud music service. In yet another embodiment, the import manager can itself be a standalone application that may be downloaded, installed, and executed by the client device. The import manager may be made available through the aforementioned web interface or standalone application, or through other channels such as an app store, other website or web page, etc. It will be appreciated that the import manager can be defined according to many different contexts and configurations, provided that the import manager facilitates the functionality for importing the user's local music library to the cloud music service as described in the present disclosure.

In one embodiment, the import manager 106 includes a metadata parser 212 for parsing metadata from an audio file, such as the metadata 204 of the audio file 202. The parsed metadata can include some (e.g. selected fields) or all of the metadata 204 available for the audio file 202. The parsed metadata is transmitted to the match logic 122 for analysis by a metadata analyzer 220 to identify one or more possible corresponding songs in a music catalog 126 of the cloud music service. More specifically, the metadata analyzer 220 compares the parsed metadata against the metadata of songs in the music catalog 126, to determine one or more songs in the music catalog having metadata matching that of the parsed metadata. It should be appreciated that the parsed metadata may be the same as, substantially similar to, somewhat similar to, or otherwise sufficiently similar beyond a predefined threshold, to be determined as matching that of a given song in the music catalog 126. Songs from the music catalog 126 which have been determined to have matching metadata are considered as possible matches for the audio file 202 in the user's local music library 104.

The import manager 106 also includes an audio sampler 214 for sampling a portion of the audio content 206 of the audio file 202. The portion of audio content sampled can be any subset of the audio content, e.g. a portion from the beginning of the audio content such as the first n seconds of the audio content. Additionally, it will be appreciated that the audio sampler 214 is configured to read and sample portions of audio content from various audio formats. The sampled audio is transmitted to the match logic 122 for analysis by an audio analyzer 222. The audio analyzer 222 compares the audio sample against a corresponding portion from the one or more songs which have been identified as possible matches.

Depending upon the particular results of the aforementioned metadata and audio sample comparison processes, the outcomes for the audio file 202 may vary. For example, if only one song is identified from the music catalog 126 as having metadata matching that of the audio file 202, then comparison of the sampled audio against that of the identified song may serve as a final check to ensure that the song has been properly identified. If the sampled audio matches a corresponding portion of the identified song, then the identified song is confirmed as a match for the audio file 202, and permission is granted to the user's account 230 to access the identified song. If the sampled audio does not match the corresponding portion of the identified song, then it may be determined that the audio file 202 does not correspond to a song in the music catalog 126 or cannot be otherwise identified, and therefore the audio file 202 will be uploaded in whole to the cloud music service and stored in association with the user's account 128.

If multiple songs are identified from the music catalog 126 as having metadata matching that of the audio file 202, then in one embodiment, comparison of the sampled audio against that of the identified songs may serve to determine which of the identified songs is the correct match for the audio file 202. If such is the case, then the song determined to be the correct match can be made available for streaming to the user. However, it may also be the case that the audio comparison does not resolve which of the identified songs is the correct match for the audio file 202. For example, the relevant portion of audio for the song may be the same or substantially similar for the various identified songs. In such a scenario, it can be useful to consider image information as described further below.

With continued reference to FIG. 2, the import manager includes image import logic 216, which is configured to generate and upload image information based on one or more images associated with the audio file 202. The image import logic 216 can be configured to search for images associated with the audio file 202 within the local library 104. An associated image may be included as part of the metadata 204 of the audio file 202, or may exist in the same directory folder as that in which the audio file 202 exists, or within a subfolder. Thus, the image import manager can be configured to search within such locations of the local library 104 to find images associated with an audio file.

When an associated image is identified, the image import logic 216 uploads image information based on the associated image. This may entail uploading the image in its entirety, or uploading a portion of the image. In one embodiment, the size of the image can be detected, and if the size is larger than a predefined threshold, the image or portion thereof is converted to a lower resolution or otherwise down-sampled to reduce the amount of data that is uploaded. In one embodiment, a hash generator 218 generates a hash of the image for uploading as the image information. After uploading to the match logic 122, an image analyzer 224 analyzes the received image information to determine which of the identified songs considered as possible matches for the audio file 202 is the correct song that matches the audio file 202. More specifically, the image analyzer 224 compares the received image information against existing corresponding image information associated with each of the songs which have previously been identified as possible matches for the audio file 202. The song having image information that matches the received image information for the audio file 202 is determined as the correct match. This song is thus made available to the user's account.

It will be appreciated that the comparison of image information between the audio file 202 and an identified song from the music catalog 126 will be in accordance with the specific nature of the image information obtained or processed from the local library 104. For example, if an image 208 associated with the audio file 202 (e.g. found in the same folder) is uploaded, the image 208 may be directly compared against an existing image 248 that is associated with the identified song from the music catalog 126. Similarly, if a portion of the image 208 is uploaded, then the portion may be compared against a corresponding portion of the image 248. If a hash of the image 208 is uploaded, then the hash may be compared against a corresponding hash of the image 248.

It should be appreciated that there may be several images associated with a given song, including various portions of album/song art such as art from a cover, liner, jacket, or other media holder, booklet pages, cd surface art, or other types of art that can be associated with a song. Thus, received image information from the image 208 may be compared against several images to determine if the underlying image 208 matches one of the images 248 associated with the identified song. Also, there may be several images associated with the audio file 202 in the local library 104, and each of these images can be processed and compared against the images associated with the identified song to determine if a match exists.

By matching an image associated with the audio file to a corresponding image associated with an identified song, the audio file can be determined to encode the identified song. As has been described, image analysis can be utilized to determine which of several identified possible songs from the cloud music catalog correctly matches a given audio file from the user's local music library. In one embodiment, the foregoing image analysis process is not performed unless there are more than one identified songs from the music catalog that may possibly match the audio file, as determined based on metadata extracted from the audio file and/or an audio sample from its audio content. In this manner, the image analysis can be utilized as necessary to decide between multiple possible matching songs which have been identified based on metadata and/or an audio sample. In another embodiment, the image analysis process is performed regardless of whether a singular song can be determined based on the audio file's metadata and/or an audio sample of its audio content, the image analysis being part of the song identification process performed for each audio file in the user's local music library that is to be imported. It should be appreciated that a given image or set of images may apply to multiple files (e.g. album art that is relevant to each track from an album), the image analysis for a given image may be performed once to identify the image, with the results being applied to improve the quality of identification of multiple audio files from a user's local music library.

In yet another embodiment, the use of images as part of the audio file identification process is a user-selectable option for import of a user's music library. For example, some users may wish to reduce the amount of bandwidth and time required to import their music libraries, and therefore may choose to forego the use of images as part of the audio file identification process. Whereas other users may seek to obtain better quality matching of their audio files to the cloud music catalog's songs, and may therefore opt to employ image analysis as part of the audio file identification process. In still other embodiments, the use of images for the audio file identification process can be automatically determined based on factors such as available network bandwidth, characteristics of the local device (e.g. device type, processor type/speed, available memory, etc.), relative availability of images in the local music library (e.g. number of audio files or folders containing images versus the total number of audio files or folders), the total number of audio files to be imported, or any other factor that may affect the impact of the image analysis process when considered as part of the overall audio file identification process.

With continued reference to FIG. 2, the user accounts storage 128 is shown to include various user accounts, such as user account 230. The user account 230 includes user settings 232, which define various settings relating to the use of the cloud music service by the user, such as the setup of the user interface provided to the user, ratings of songs by the user, listening preferences, playlists, music/audio subscriptions, social network related settings, locations of music to sync to the cloud library, or any other aspect of the cloud music service which can be tailored for the user. A history 234 includes data defined from the user's historical activity on the cloud music service, such as listening activity, social activity, and other types of activity.

Once a correct song matching an audio file is identified, that song is "added" to the user's cloud music library—that is, the song is made available to the user via their user account for streaming from the cloud music service. In one embodiment, the song is added to a song list 236, which defines the songs from the music catalog 126 that are available for streaming by the user accessing the cloud music service who is logged in to his/her user account 230. In one embodiment, each song in the music catalog 126 has an associated unique identifier that may be added to a given user's song list when the song is to be made accessible to that user's account. The song 242 is shown as having the associated ID 247. Thus, in the illustrated embodiment, when song 242 is identified as matching the audio file 202 from the user's local library 104, the ID 247 is added to the song list 236.

As has been noted, identification of the audio content of an audio file can be difficult when the audio content is for a song for which there are explicit and non-explicit versions. Based on metadata of the audio file, and even in combination with an audio sample from the audio content, it may not be possible to conclusively identify which version of the song corresponds to the audio file. In such a situation, related images can be analyzed to determine which version of the song is the correct one matching the audio file. For example, the album art of the explicit version may differ from that of the non-explicit version, and thus, the correct song can be identified based on matching one or more images from the local music library to the album art from either of the versions.

In some embodiments, the cover art of the explicit version may differ from that of the non-explicit version by the presence or absence of a warning label. Some typical examples of warning labels include words or phrases such as the following: "EXPLICIT LYRICS," "EXPLICIT CONTENT," "PARENTAL ADVISORY," "PARENTAL ADVISORY EXPLICIT CONTENT," "PARENTAL ADVISORY EXPLICIT LYRICS," etc. Warning labels can be stylized so as to be easily identifiable against the remainder of the cover art. One specific example of a warning label is the Parental Advisory Logo utilized in accordance with the Parental Advisory Label (PAL) Program administered by the Recording Industry Association of America (RIAA).

Accordingly, in various embodiments, the image analysis process may entail detection of the presence or absence of an explicit content warning label within an image. For example, in one embodiment, the image import logic 216 is configured to search within the image 208 for such a warning label, and transmit the results to the match logic 122 for use in identifying a matching song from the music catalog 126 for the audio file 202 in the user's local music library 104 to which the image 208 relates. In another embodiment, the image analyzer 224 can be configured to detect the presence or absence of a warning label in the image 208 based on analysis of the image data received from the image import logic 216.

Figure 3:
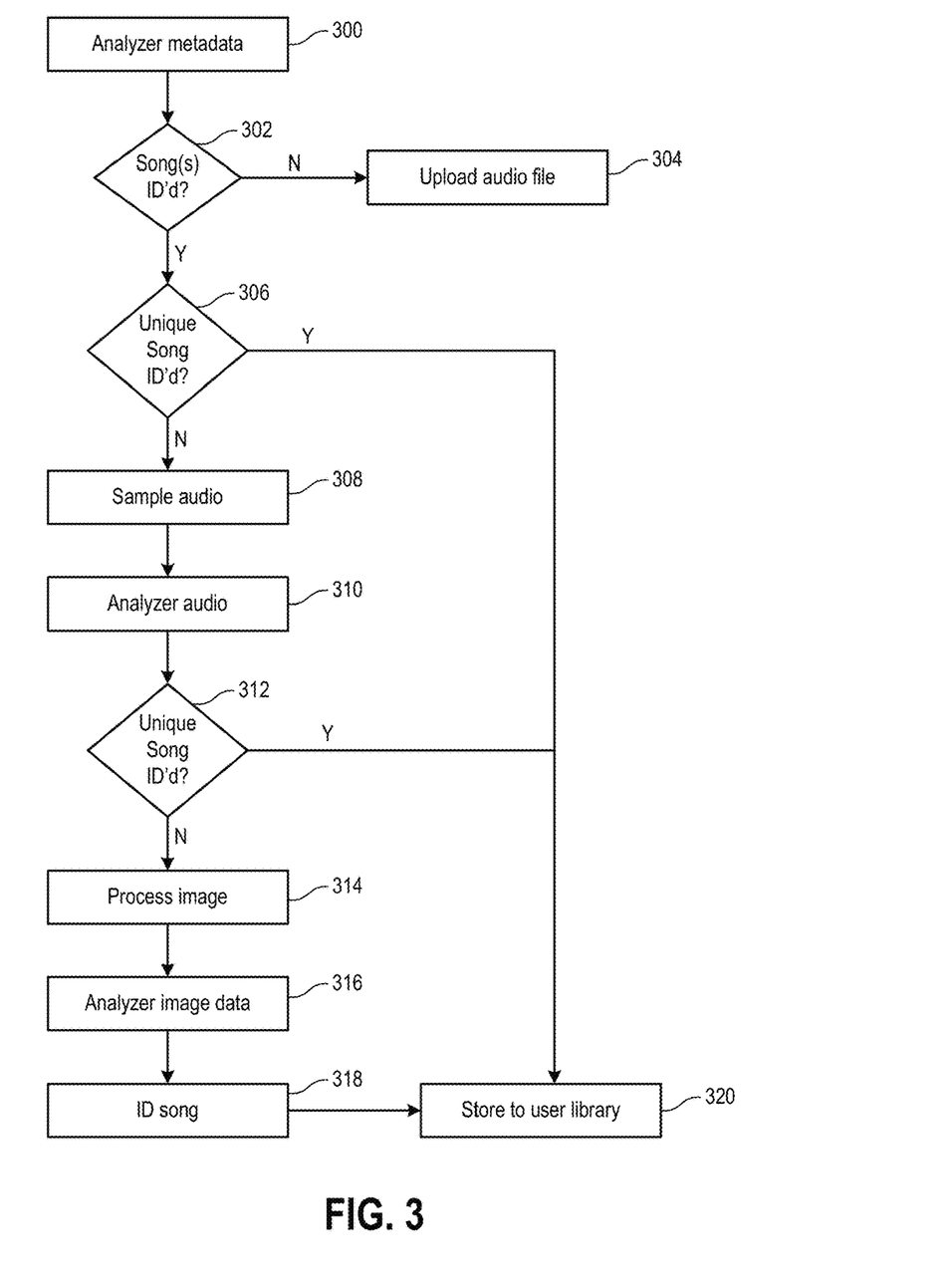
FIG. 3 illustrates a method for adding a song to a cloud-based music library based on identification of the audio content of an audio file in a local music library, in accordance with an embodiment of the disclosure.

FIG. 3 illustrates a method for adding a song to a cloud-based music library based on identification of the audio content of an audio file in a local music library, in accordance with an embodiment of the disclosure. At operation 300, metadata from the audio file is analyzed to identify one or more songs from a cloud-based music catalog which are identified by or match the metadata. At method operation 302, it is determined whether any song is identified from the music catalog as corresponding to the metadata. If no, then at operation 304, the audio file is uploaded to the user's cloud-based music library. If yes, then at operation 306 it is determined whether a single unique song from the cloud-based music catalog is identified as corresponding to the metadata. If yes, then at operation 320, that song is added to the user's cloud-based music library (e.g. a permission is set for the user's account to allow the user to access (e.g. stream) the song from the cloud-based music service). If no (in which case multiple songs have been identified), then at operation 308, a sample is taken from the audio content of the audio file.

At operation 310, the audio sample is analyzed to determine whether it matches the audio content of any of the previously identified songs. At operation 312, it is determined whether a single one of the previously identified songs can be determined as the correct song matching the audio file based on the additional audio analysis. If yes, that at operation 320, the matching song is added to the user's cloud music library. If no, then at operation 314, an image related to the audio file (e.g. stored in a same folder as the audio file) is identified and processed to generate image data for analysis. By way of example, a hash of the image may be generated. At operation 316, the image data resulting from processing the image is analyzed to determine if it matches corresponding image data for one of the previously identified songs. At operation 318, if on the basis of the image analysis a single one of the previously identified songs can be determined, then that song is added to the user's cloud music library at operation 320.

If the image analysis does not enable determination of a single one of the previously identified songs as the correct match for the audio file, then alternative operations may be performed in accordance with various embodiments. In one embodiment, the previously identified songs corresponding to the audio file's metadata and audio sample may be presented as options for the user to choose from. The selected song is then added to the user's cloud music library. In another embodiment, the audio file from the user's local music library is uploaded to the cloud music library, as defined by method operation 304.

Figure 4A:
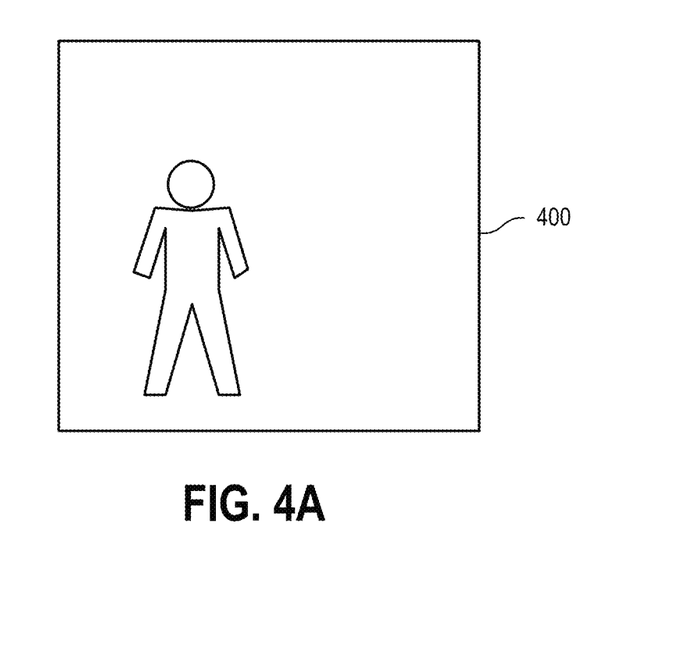
FIG. 4A illustrates album art for a non-explicit version of an album, in accordance with an embodiment of the disclosure.
Figure 4B:
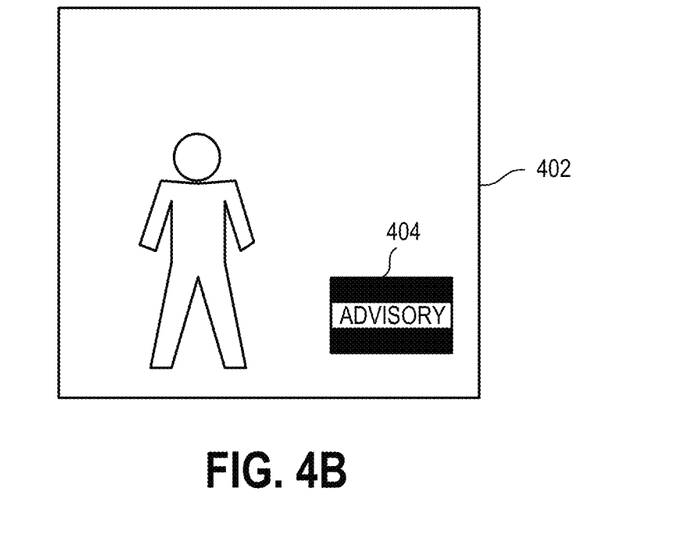
FIG. 4B illustrates album art for an explicit version of the same album as that of FIG. 4A, in accordance with an embodiment of the disclosure.

FIG. 4A illustrates album art for a non-explicit version of an album, in accordance with an embodiment of the disclosure. The image 400 is from an album cover for a given album or song. FIG. 4B illustrates album art for an explicit version of the same album as that of FIG. 4A, in accordance with an embodiment of the disclosure. As shown, the image 402 of the explicit version of the album is substantially the same as the image 400, but includes an advisory logo 404. The advisory logo 404 distinguishes the explicit version of the album from the non-explicit version. Thus, in accordance with embodiments of the disclosure, image analysis can be employed to determine if cover art matches that of an explicit or non-explicit version of a song/album. Images may be analyzed to identify the presence or absence of an advisory logo 404. Based on such image analysis, the accuracy of song identification for a given audio file can be improved.

Figure 5:
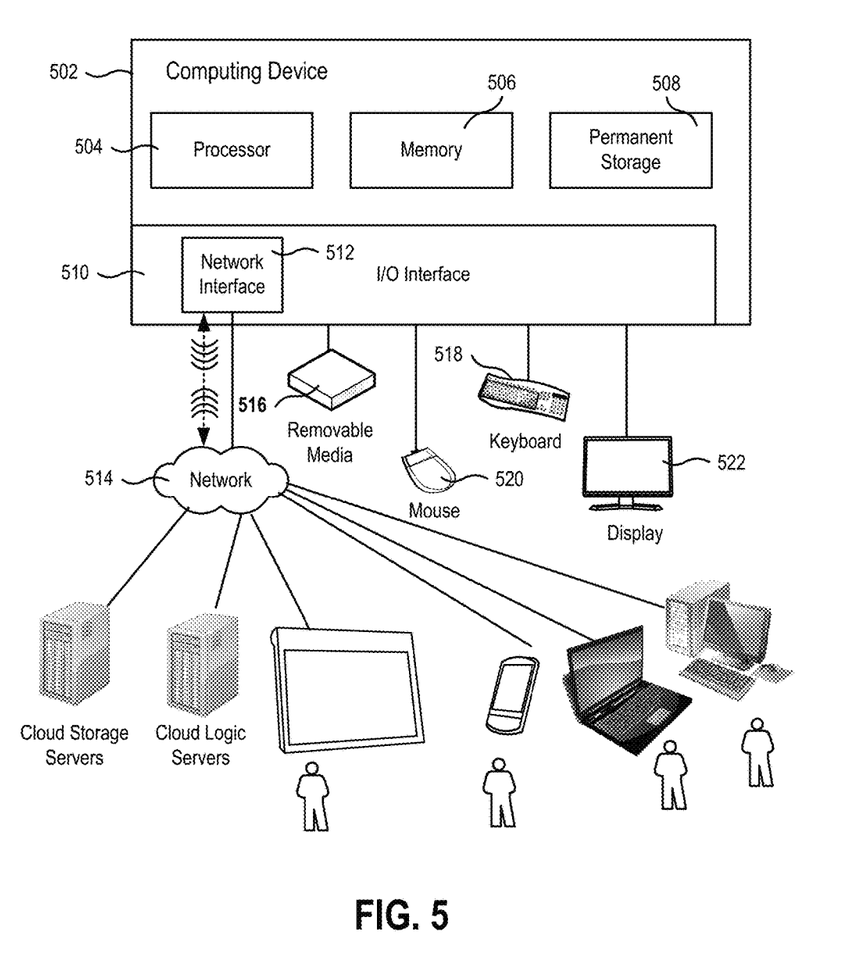
FIG. 5 is a simplified schematic diagram of a computer system for implementing embodiments of the present disclosure.

FIG. 5 is a simplified schematic diagram of a computer system 502 for implementing embodiments of the present disclosure. FIG. 5 depicts an example computer environment for implementing embodiments of the disclosure. It should be appreciated that the methods described herein may be performed with a digital processing system, such as a conventional, general-purpose computer system. Special purpose computers, which are designed or programmed to perform only one function, may be used in the alternative. The computer system 502 includes a processor 504, which is coupled through a bus to memory 506, permanent storage 508, and Input/Output (I/O) interface 510.

Permanent storage 508 represents a persistent data storage device such as a hard drive or a USB drive, which may be local or remote. Network interface 512 provides connections via network 514, allowing communications (wired or wireless) with other devices. It should be appreciated that processor 504 may be embodied in a general-purpose processor, a special purpose processor, or a specially programmed logic device. Input/Output (I/O) interface 510 provides communication with different peripherals and is connected with processor 504, memory 506, and permanent storage 508, through the bus. Sample peripherals include display 522, keyboard 518, mouse 520, removable media device 516, etc.

Display 522 is configured to display the user interfaces described herein. Keyboard 518, mouse 520, removable media device 516, and other peripherals are coupled to I/O interface 510 in order to exchange information with processor 504. It should be appreciated that data to and from external devices may be communicated through I/O interface 510. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data that can be read by a computer system. Examples of the non-transitory computer readable storage medium include permanent storage 508, network attached storage (NAS), read-only memory or random-access memory in memory module 506, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Additionally, FIG. 5 shows various types of devices that can connect to the network, such as the Internet. The devices include servers, tablet computers, smartphones, laptops, desktops, etc. The various devices can run operating systems, and the operating systems can vary from manufacturer to manufacturer.

Some, or all operations of the method presented herein are executed through a processor, such as processor 504 of FIG. 5. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method comprising:
receiving, by a server, metadata obtained from an audio file stored on a client device communicatively coupled to the server, wherein the client device is associated with a user account;
determining, by the server, whether a first single content item of server-based audio content corresponds to the received metadata from the audio file, wherein, in response to determining that only the first single content item of server-based audio content corresponds to the received metadata from the audio file stored on the client device, the first single content item of the server-based audio content is added to a server library associated with the user account;
in response to determining that a plurality of server-based audio content items each correspond to the received metadata such that there are multiple matches between the metadata and the server-based audio content, receiving, by the server, an audio sample obtained from audio content of the audio file, determining whether the audio sample corresponds to a second single content item of the plurality of server-based audio content items, and adding the second single content item of the plurality of server-based audio content items to the server library associated with the user account in response to determining that the second single content item of the server-based audio content corresponds to the received audio sample and the received metadata;

in response to determining that a subset of the plurality of server-based audio content items correspond to the received metadata and the audio sample such that there are multiple matches between the metadata and the audio sample with the server-based audio content:

accessing, by the server, image data processed from an image associated with the audio file stored on the client device from the second multiple of server-based audio content items that correspond to the audio sample;

comparing, by the server, the image data of the image associated with the audio file with image data associated with each of the subset of the plurality of server-based audio content items to determine whether one of the subset of the plurality of server-based audio content items matches the audio file stored on the client device, wherein the comparing further comprises determining, based on the image data, whether the audio content of the audio file corresponds to an explicit version or a non-explicit version of a song;

adding, by the server, a third single content item to the server library associated with the user account in response to determining that the third single content item matches the audio file stored on the client device based on the metadata, the audio sample, and the image data; and granting, by the server, a permission to the client device to access server-based audio content including the third single content item corresponding to the audio file.

2. The method of claim 1, wherein the metadata includes one or more of a file name, an artist, a title, or an album.

3. The method of claim 1, wherein the image associated with the audio file is stored in the metadata from the audio file or stored in a same directory on the client device as the audio file.

4. The method of claim 1, wherein comparing the image data includes determining whether the image data corresponds to image data associated with the explicit version of the song or to image data associated with the non-explicit version of the song.

5. The method of claim 1, wherein comparing the image data includes determining the presence or absence of an advisory label in the image data.

6. A method for adding a song to a music account of a user stored on a server, comprising:

receiving, by the server, metadata obtained from an audio file stored on a client device communicatively coupled to the server, wherein the client device is associated with a user account;

analyzing, by the server, the metadata to identify a first one or more songs corresponding to the audio file, wherein, in response to determining that only a first single song corresponds to the received metadata based on the analysis of the metadata, the first single song is added to a server library associated with the user account and a first permission is granted to the client device to access server-based audio content of the first single song;

in response to determining that a plurality of server-based songs each correspond to the received metadata, receiving, by the server, an audio sample obtained from audio content of the audio file;

analyzing, by the server, the audio sample to determine whether a second one or more songs from the plurality of server-based songs corresponding to the audio file;

determining whether one of the plurality of server-based songs correspond to the identity of the second one or more songs based on the analysis of the metadata and based on the analysis of the audio sample such that there are multiple matches between the server-based songs, the metadata, and the audio sample, wherein, in response to determining that only a second single song from the plurality of server-based songs corresponds to the received metadata and the received audio sample based on the analysis of the metadata and the analysis of the audio sample, the second single song is added to the server library associated with the user account and a second permission is granted to the client device to access server-based audio content of the second single song;

in response to determining that a subset of the plurality of songs correspond to the received metadata and the received audio sample based on the analysis of the metadata and the analysis of the audio sample, receiving, by the server, image data processed from an image associated with the audio file, comparing the image data associated with the audio file with image data associated with each of the subset of the plurality of songs to identify a third single song from the subset of the plurality of songs which includes determining, based on the image data, whether the audio content of the audio file corresponds to an explicit version or a non-explicit version of a song, and adding the third single song to a server library associated with the user account based on the comparison of image data; and granting a permission to the client device to access the identified song from the server library associated with the user account.

7. The method of claim 6, wherein the metadata includes one or more of a file name, an artist, a title, or an album.

8. The method of claim 6, wherein the image associated with the audio file is stored in the metadata from the audio file or stored in a same directory on the client device as the audio file.

9. The method of claim 6, wherein comparing the image data includes determining whether the image data corresponds to image data associated with the explicit version of the song or to image data associated with the non-explicit version of the song.

10. The method of claim 6, wherein comparing the image data includes determining the presence or absence of an advisory label in the image data.

11. A method comprising:

receiving, by a server, metadata and an audio sample obtained from an audio file stored on a client device communicatively coupled to the server, wherein the client device is associated with a user account;

in response to determining that a plurality of server-based audio content items contain metadata and audio content that matches the received metadata and the audio sample such that there are multiple matches between the metadata and the audio sample with the server-based audio content:

accessing, by the server, image data processed from an image associated with the audio file stored on the client device from the plurality of server-based audio content items that match the metadata and the audio sample;

comparing, by the server, the image data of the image associated with the audio file with image data associated with each of the plurality of server-based audio content items that match the metadata and the audio sample to determine which one of the plurality of server-based audio content items matches the image data based on the comparison, wherein the comparing further comprises determining, based on the image data, whether the audio content of the audio file corresponds to an explicit version or a non-explicit version of a song; and adding, by the server, a single content item to a server library associated with the user account in response to determining that the single content item matches the audio file stored on the client device based on the metadata, the audio sample, and the image data; and granting, by the server, a permission to the client device to access server-based audio content including the single content item corresponding to the audio file.

12. The method of claim 11, wherein the image associated with the audio file is stored in the metadata from the audio file or stored in a same directory on the client device as the audio file.

13. The method of claim 11, wherein comparing the image data includes determining whether the image data corresponds to image data associated with the explicit version of the song or to image data associated with the non-explicit version of the song.

14. The method of claim 11, wherein comparing the image data includes determining the presence or absence of an advisory label in the image data.

\* \* \* \* \*